Sept. 9, 1952     R. A. FARRELL ET AL     2,609,735
APPARATUS FOR SEALING CONTAINERS
Filed July 18, 1947     8 Sheets-Sheet 1
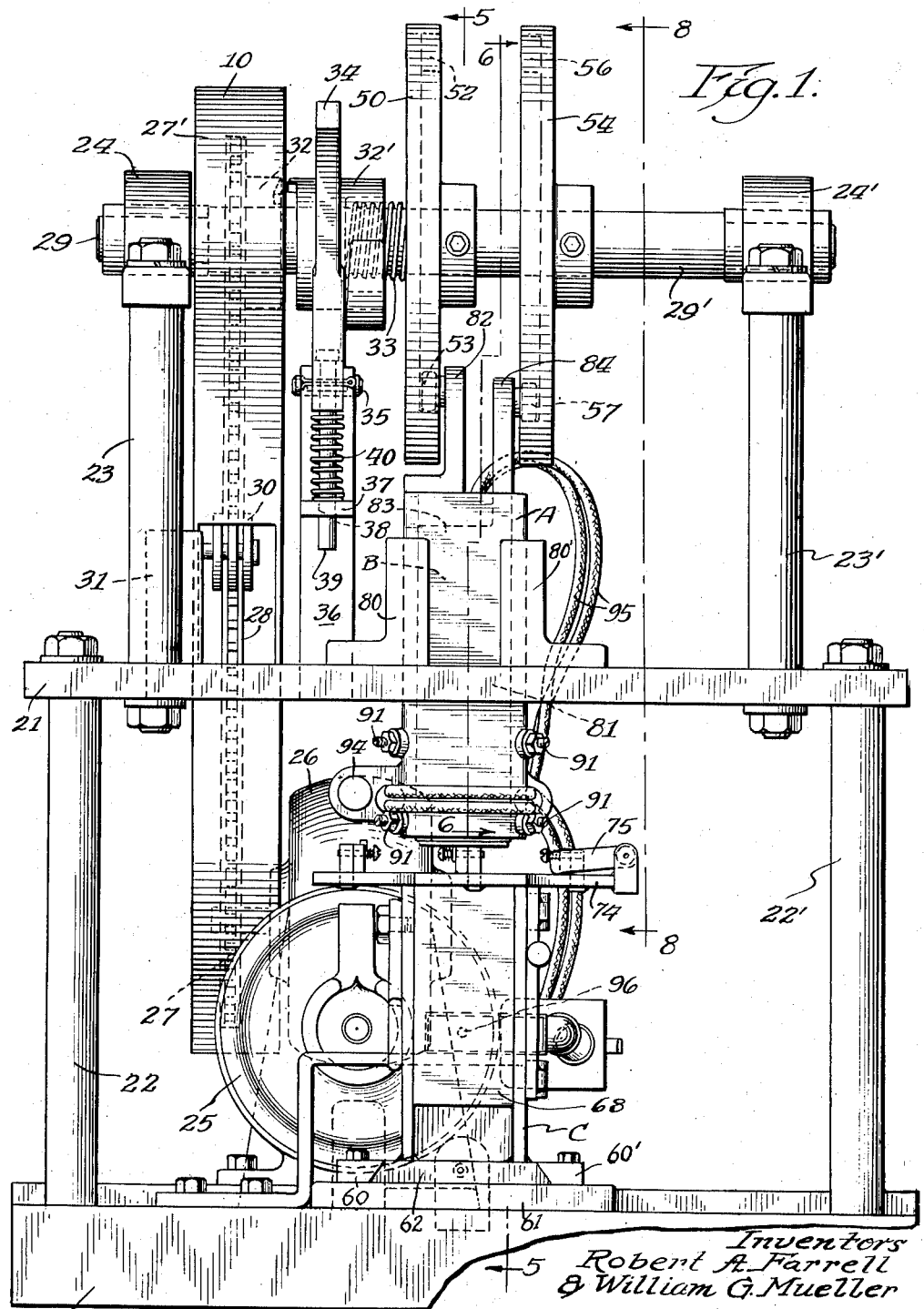
Inventors
Robert A. Farrell
& William G. Mueller
By Joseph Rossman
Atty.

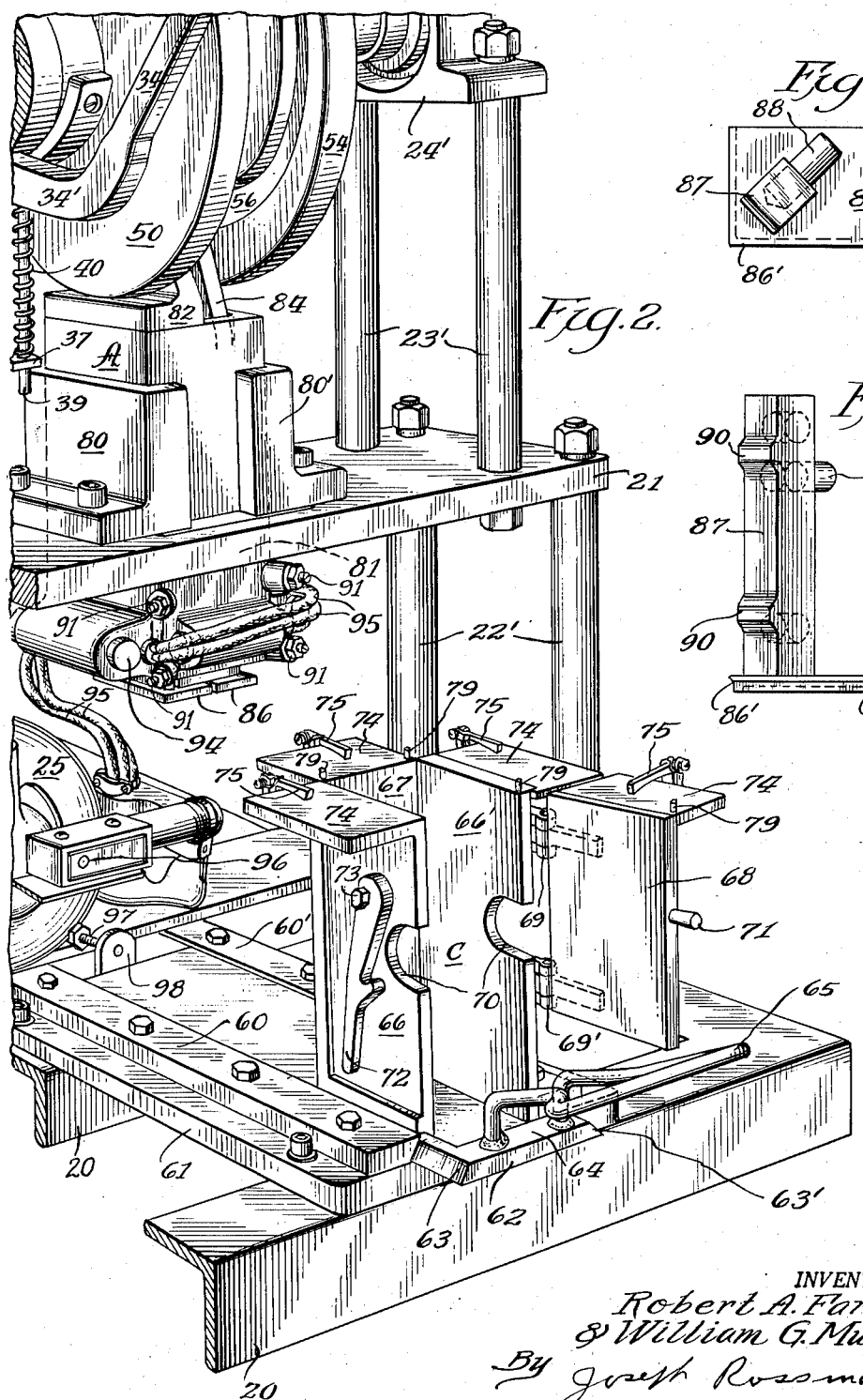

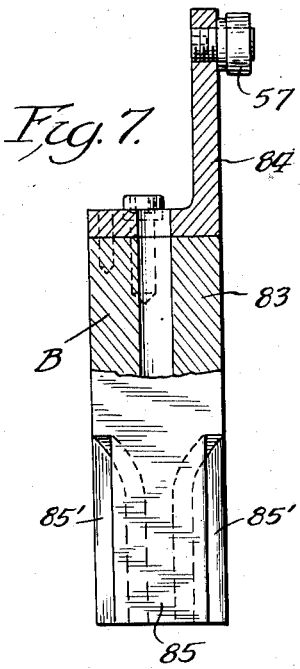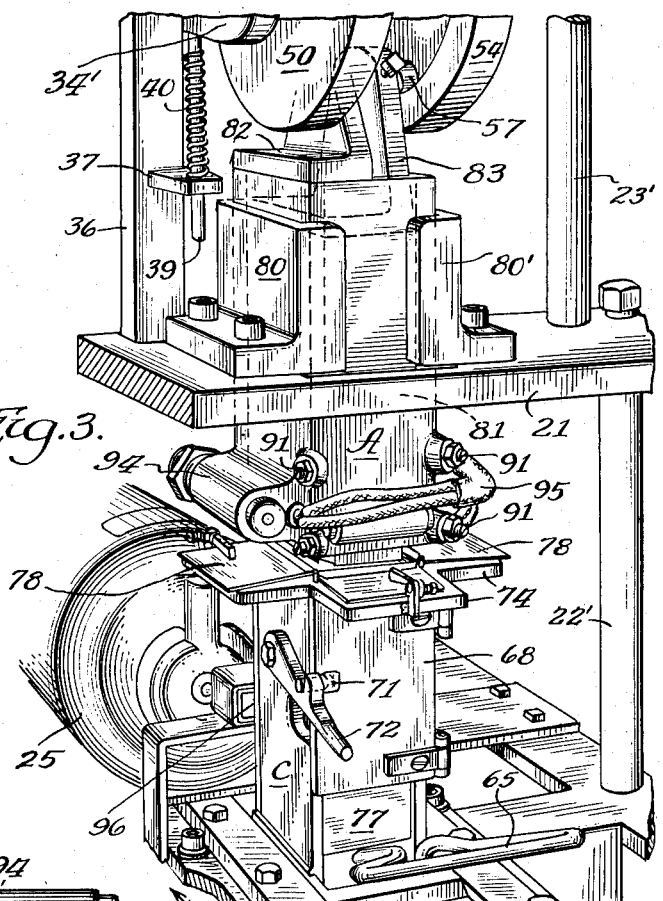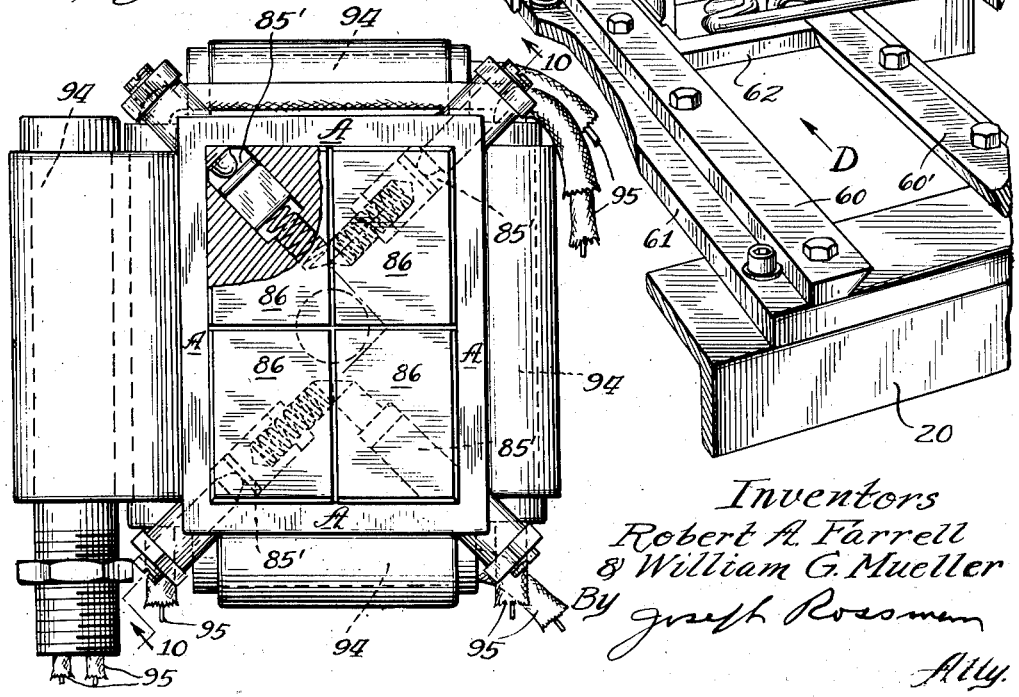

Sept. 9, 1952 R. A. FARRELL ET AL 2,609,735
APPARATUS FOR SEALING CONTAINERS
Filed July 18, 1947 8 Sheets-Sheet 4

INVENTORS:
Robert A. Farrell
& William G. Mueller
By Joseph Rossman
Atty

Sept. 9, 1952  R. A. FARRELL ET AL  2,609,735
APPARATUS FOR SEALING CONTAINERS
Filed July 18, 1947  8 Sheets-Sheet 5
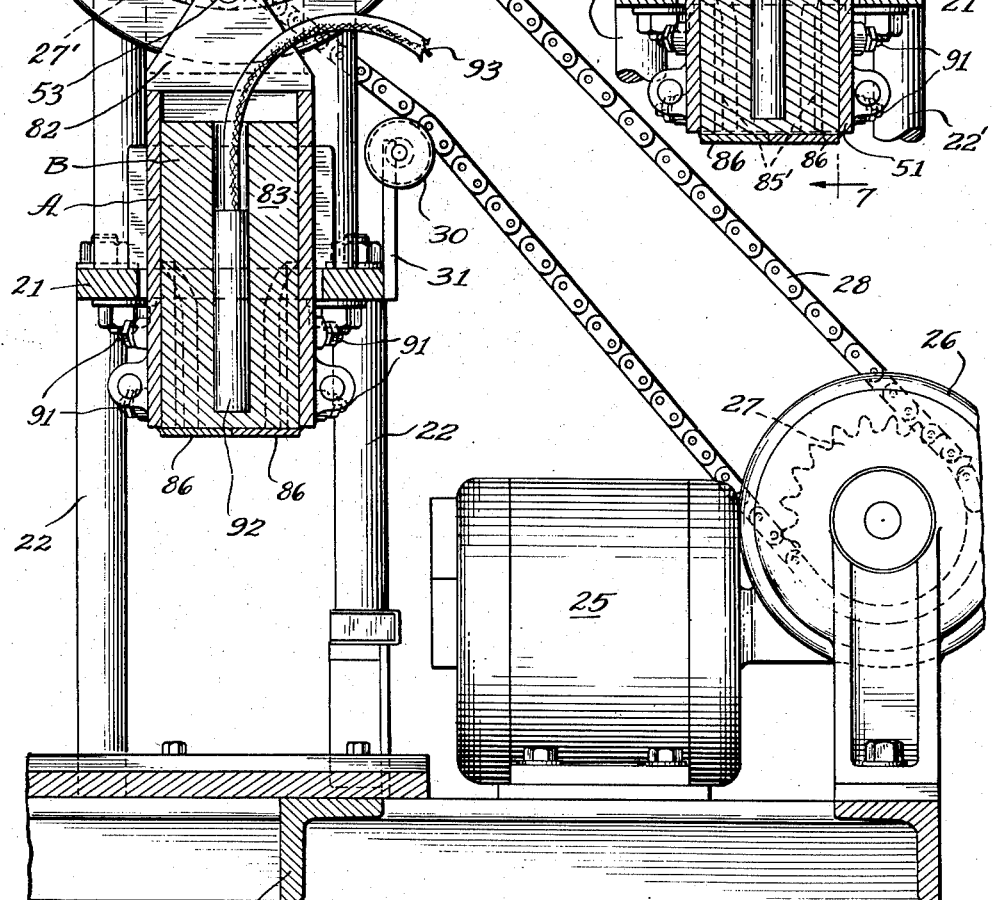
Inventors:
Robert A. Farrell
& William G. Mueller
By Joseph Rossman
Atty.

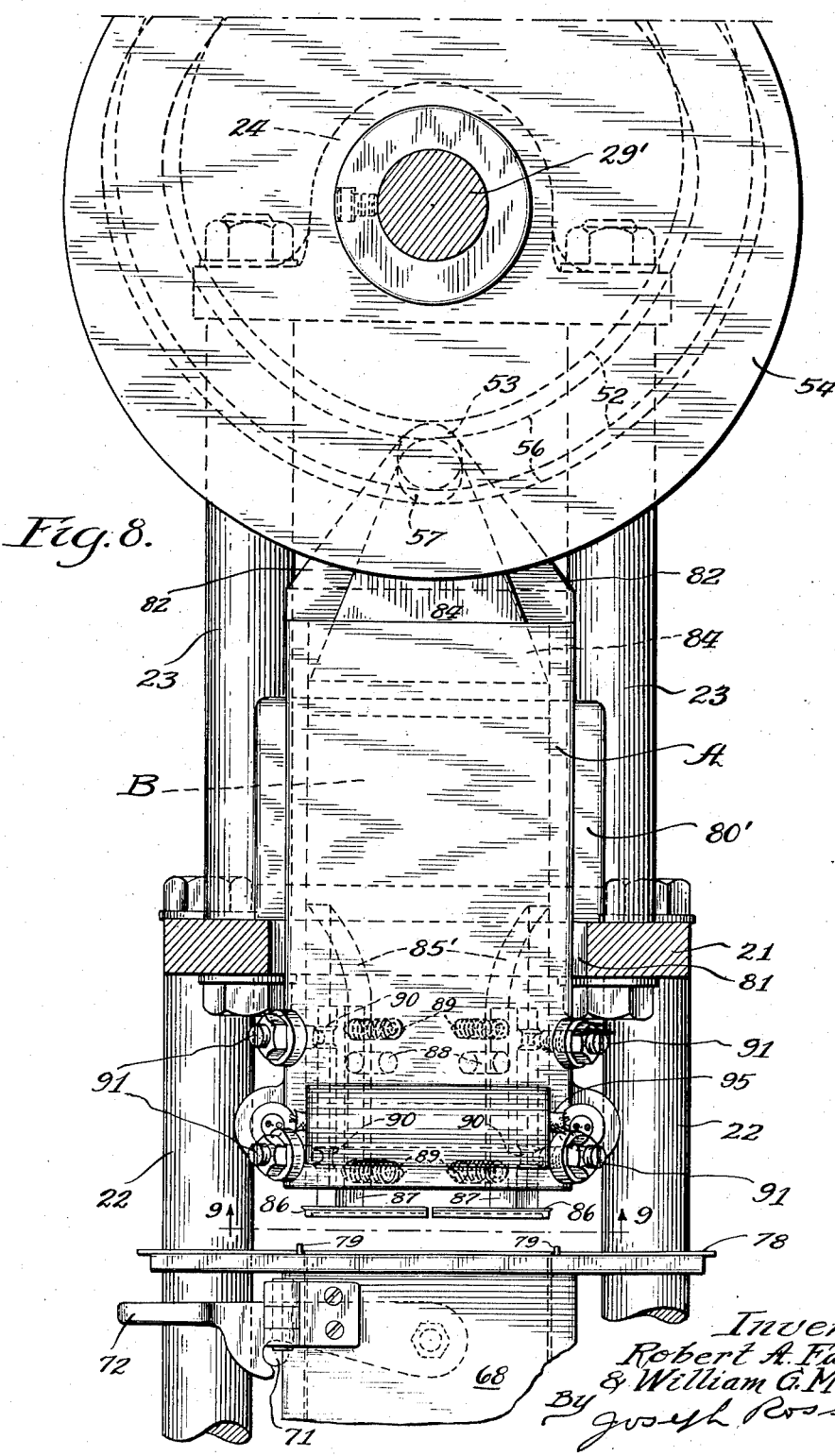

Sept. 9, 1952   R. A. FARRELL ET AL   2,609,735
APPARATUS FOR SEALING CONTAINERS
Filed July 18, 1947   8 Sheets-Sheet 7
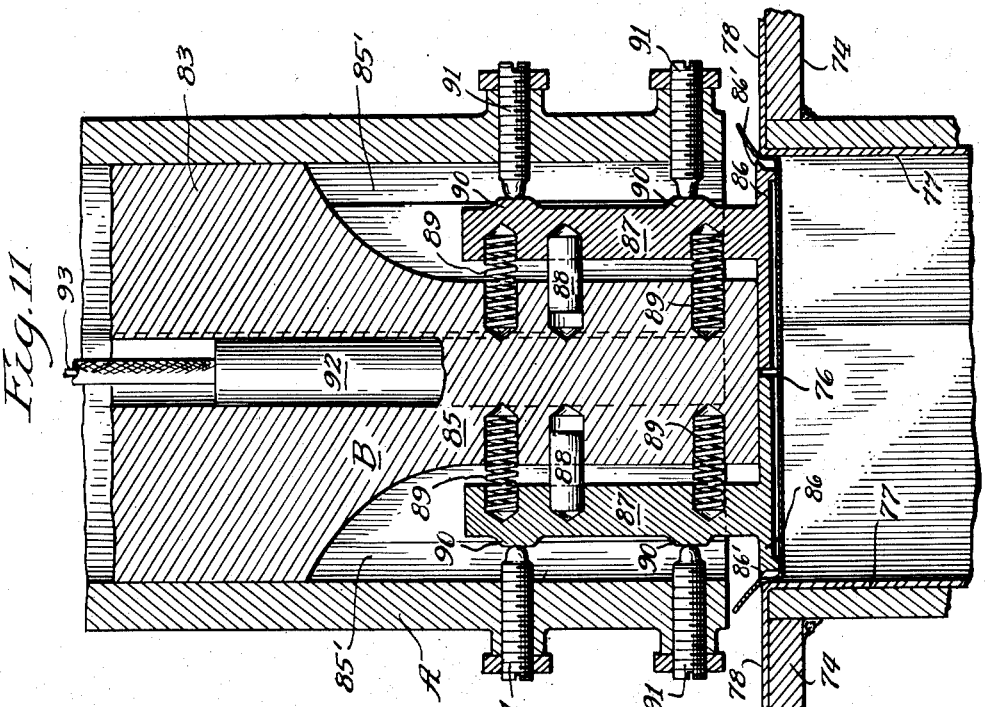
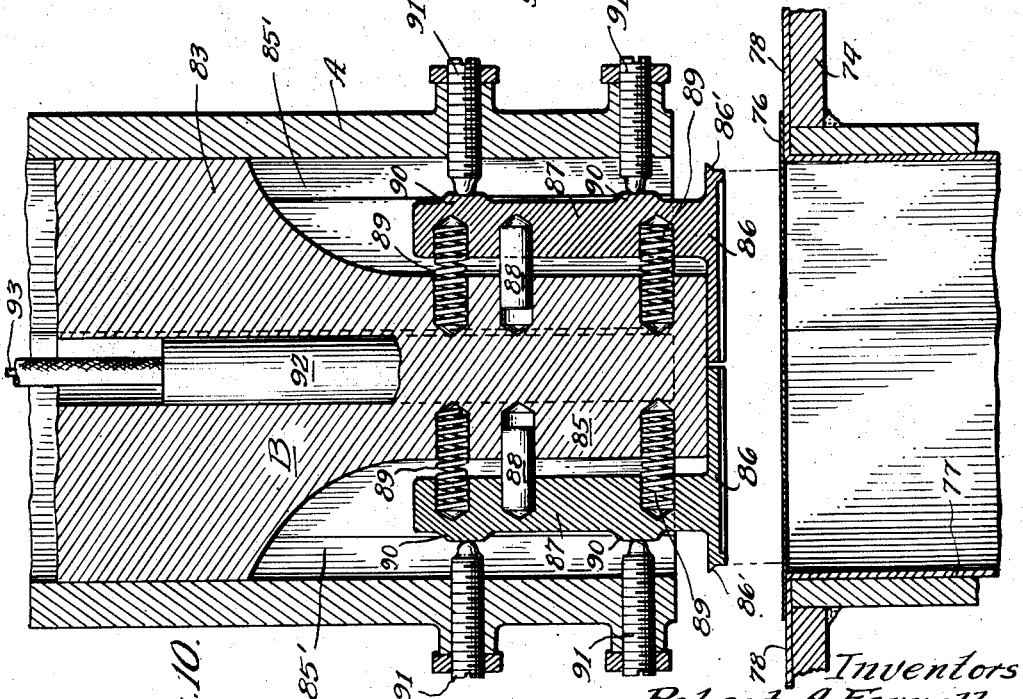
Inventors
Robert A. Farrell
& William G. Mueller
By Joseph Rossman
Atty.

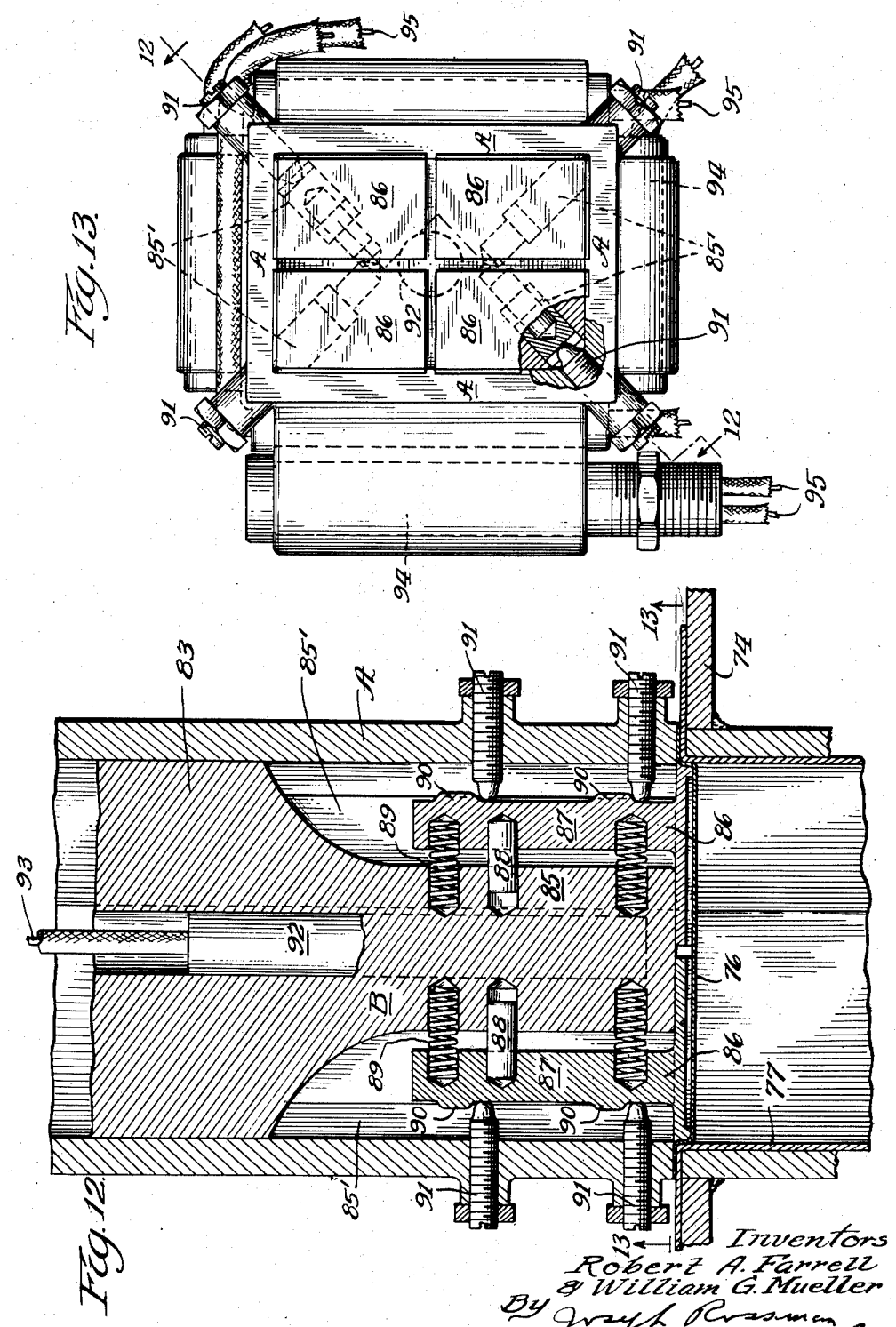

Patented Sept. 9, 1952

2,609,735

UNITED STATES PATENT OFFICE 2,609,735

APPARATUS FOR SEALING CONTAINERS

Robert A. Farrell, Menasha, and William G. Mueller, Neenah, Wis., assignors to Marathon Corporation, Rothschild, Wis., a corporation of Wisconsin Application July 18, 1947, Serial No. 761,968

7 Claims. (Cl. 93—39.1)

1

The present invention relates to a machine for fabricating leakproof and siftproof packages.

The primary purpose of the invention is to provide a machine which will commercially and economically produce packages by molding and sealing a thermoplastic or thermoplastic coated flexible sealing membrane within the opening of a tubular carton and onto its flaps. The inner face of the carton may be treated, if desired, with any suitable type of heat-sealable coating.

Other objects and advantages of the present invention will more fully appear from the following description and drawings, wherein:

Figure 1 is a front view of the machine;

Figure 2 is a perspective view of a portion of the machine illustrating the carton positioning chamber in open position to receive a carton and a membrane to be sealed at an end thereof;

Figure 3 is a perspective view of a portion of the machine illustrating the carton positioning chamber, which contains a carton and a membrane in place at one end thereof, in position under the molding and sealing heads preparatory to molding and sealing the membrane within the carton opening;

Figure 5 is a vertical cross-section taken along the line 5—5 of Figure 1 showing the cam means for actuating the outer sealing head;

Figure 6 is a vertical cross-section taken along the line 6—6 of Figure 1 showing the cam actuating means for the inner molding and sealing head;

Figure 7 is a section taken along the line 7—7 of Figure 6 showing in detail the cam follower secured to the inner sealing head;

Figure 8 is a vertical cross-section taken along the line 8—8 of Figure 1 showing in composite the cam actuating means for both the inner and outer sealing heads;

Figure 9 is a bottom plan view of the inner and outer sealing heads of the molding and sealing mechanism taken along the line 9—9 of Figure 8;

Figure 10 is a transverse cross-section along the line 10—10 of Figure 9 showing the relationship of the inner and outer sealing heads in their uppermost or initial positions;

Figure 11 is a view similar to Figure 10 illustrating an intermediate stage of the molding

2 and sealing operation and showing the relationship of inner and outer sealing heads with respect to each other and the membrane being molded and sealed within the carton opening;

Figure 12 is a view similar to Figures 10 and 11 and taken along the line 12—12 of Figure 13 showing the position of the sealing heads upon the completion of the molding and sealing of the membrane within the carton opening and to the flaps;

Figure 13 is a bottom plan view taken along the line 13—13 of Figure 12 illustrating the position of the expanded blades of the inner molding and sealing head;

Figure 14 is a detailed view of one of the blade elements of the inner sealing head;

Figure 15 is a plan view of the blade construction shown in Figure 14; and

Figure 16:
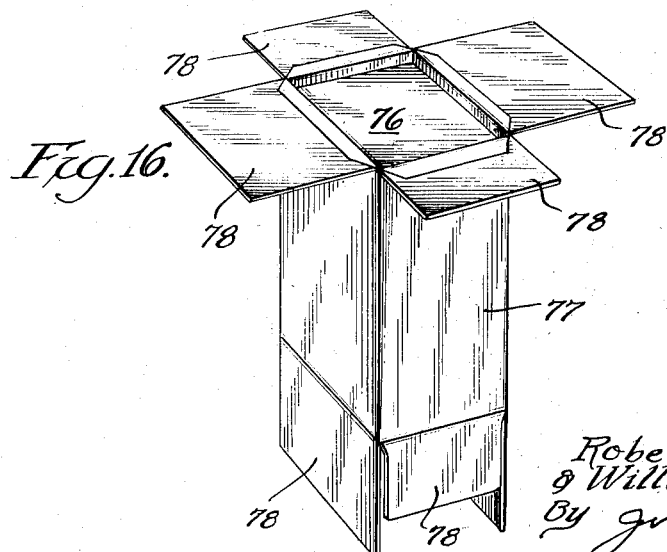

Figure 16 is a perspective view of a carton having a flexible membrane molded and sealed in one end thereof by the machine of the present invention.

Referring to the drawings, the machine includes a support 20, a horizontal plate 21, supporting rods 22, 22' and 23, 23', and brackets 24, 24' bolted into a unitary structure. A motor 25 is fastened to the support 20 and through a gear box 26, sprockets 27, 27' and chain 28 supplies power to turn a shaft 29 journalled in the brackets 24 and 24'. A reach of the chain 28 may, if desired, be supported by a roller 30 journalled in a bracket 31 secured to the plate 21. A hood 10 may be used to cover and protect the driving means comprising the sprockets 27, 27', chain 28 and supporting roller 30.

The shaft 29 has secured thereto a clutch preferably of the positive type comprising a driving clutch element 32 mounted for rotation with shaft 29 and adapted to engage the driven clutch element 32' mounted for rotation with shaft portion 29'. The driven clutch element 32' is maintained in its inoperative position by means of a tension spring 33. To engage the clutch driving and driven elements 32 and 32' and to overcome the tension of the spring 33 upon the latter, a handle 34 is coupled to the driven clutch element 32'. The handle 34 having a portion thereof 34' in a substantially horizontal plane is fulcrumed at 35 to a vertical supporting bar 36 fixed to the plate 21. The supporting bar 36 has secured thereto a horizontally disposed bracket 37 having an opening 38. A rod 39 fixed to the underside of portion 34' of the handle 34 extends downwardly through the opening 38 of the bracket 37. A compression spring 40 encircles the rod 39 and has its ends abutting the handle portion 34' and the bracket 37. The compression spring 40 maintains the handle 34 in its uppermost inoperative position. By depressing the handle 34 the driven clutch element 32' is rotated slightly and to the left (Figure 1) to cause the teeth of the driven and driving clutch elements 32, 32' to engage and thus rotate the driven shaft portion 29'. The mechanism described will cause the shaft portion 29' to make one complete revolution whereupon the clutch elements will disengage.

Fixed to the shaft 29' for rotation therewith is a cam plate 50 for actuating an outer sealing head A, which will be subsequently described in detail. The cam plate 50 possesses a cam groove 52 in a surface which cooperates with and receives a cam follower 53.

Also fixed to the shaft portion 29' for rotation therewith and adjacent the cam plate 50 is a cam plate 54 for actuating an inner sealing and molding head B, which will subsequently be described in detail. The cam plate 54 has a cam groove 56 in a surface thereof which cooperates with and receives a cam follower 57.

As shown in Figures 1, 2 and 3 horizontally disposed beveled guide members 60 and 60' are bolted to a plate 61 which in turn is secured to the support 20. Cooperating with the beveled guide members 60, 60' for sliding engagement therewith is the chamber C for holding and positioning a carton 77. This chamber also provides means for positioning a membrane 76 to be molded and sealed within the end and onto the flaps 78 of the carton. The chamber further provides a support for the outer sealing head A which adheres the marginal edges of the membrane to the areas of the flaps adjacent the carton opening.

The chamber C includes a base 62 having beveled sides 63, 63' in sliding engagement with the beveled guide members 60, 60'. Secured to a front portion 64 of the base 62 is a handle 65. Fixed to the base 62 are two side walls 66, 66' and a back wall 67. The fourth wall 68 in front of the chamber C is hinged at 69 and 69' to the side wall 66' and permits access to the chamber so that a carton may be positioned therein. The side walls 66, 66' have openings 70 in their forward areas to facilitate removal or insertion of the carton. The hinged front wall 68 has a pin 71 secured to its front vertical edge which in cooperation with a latch 72 pivotally mounted at 73 on the side wall 66 permits locking the wall 68 to form a closed chamber C.

Figure 4:
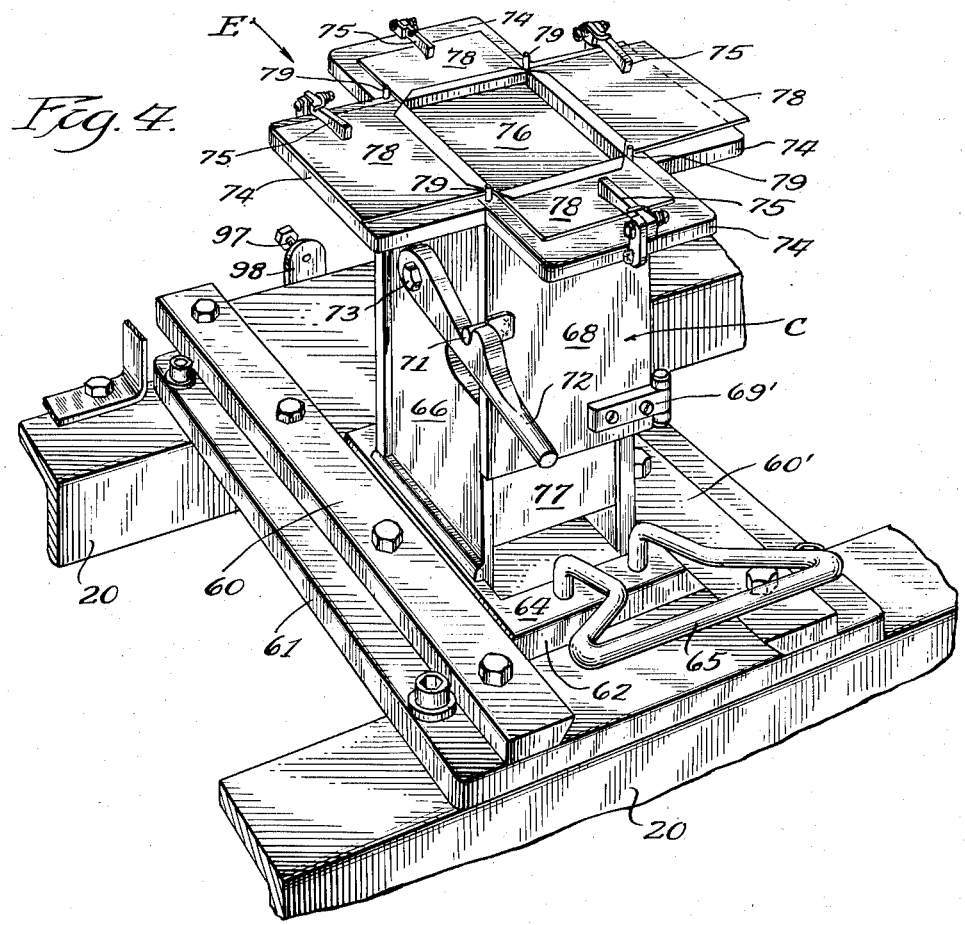
Figure 4 is a perspective view of the carton positioning chamber removed from under the molding and sealing heads after the membrane has been molded and sealed to the inner periphery and flaps of a carton.

Preferably, each of the walls of the chamber has formed at its upper edge a horizontally extending flap support 74. Each flap support 74 has hinged at an outer edge a pivoted flap holding lug 75 which may be spring mounted to assure that the flaps are held in flat condition against the flap support 74. It is understood that the top surfaces of the walls comprising the chamber C may constitute the flap supporting surfaces. To assure that the membrane 76 is perfectly aligned with respect to the opening of a carton 77 and its flaps 78, particularly in the corner areas, it is desirable to provide membrane locating pins 79 fixed to the flap supports 74 at the corner areas, as shown in Figure 4.

Supported beneath the cam plates 50 and 54 and secured to the plate 21 are a pair of brackets 80 and 80'. The plate 21 has an opening 81 so that the outer sealing head A may have vertical motion imparted thereto while confined and guided by the brackets 80, 80'. The outer sealing head A is a hollow metallic sleeve. The dimensions of the opening are approximately equal to the dimensions of the carton opening to be sealed. The thickness of the sleeve is at least equal to the amount it is desired to have the membrane 76 overlap the flaps 78 in the areas adjacent the carton opening. This construction is illustrated in Figures 10, 11 and 12.

The outer sealing head A is connected to the cam follower 53 by means of a connecting member 82. If desired the connecting member 82 and the outer outer sealing head A may be integrally formed. Rotation of the shaft portion 29' will rotate the cam plate 50 and cause the outer sealing head to move in a vertical plane by virtue of the movement of the cam follower 53 within the cam groove 52.

Guided for movement within the hollow sleeve comprising the outer sealing head A is the inner sealing and molding or shaping head B which is adapted to depress, mold and seal the membrane 76 within the opening of the carton 77 and to its walls. The inner sealing head B is designed to expand and seal portions of the membrane against the inner periphery of the carton. The inner sealing and molding head B comprises a metallic inner sealing member 83 of the same dimensions as the opening of the hollow outer sealing head A. At its upper edge the inner sealing member 83 is connected to the cam follower 57 by means of a connecting member 84. If desired the connecting member 84 and the member 83 may be integrally formed. The inner sealing member 83 has a lower portion 85 with four slots 85', one in each corner. Mounted in each slot 85' for radial or transverse movement with respect to the inner sealing member 83 is a metallic blade member 86 of square configuration. The mounting of these blades is such that they will move vertically with the inner sealing head as well as radially with respect thereto.

As shown in Figures 9 to 13, each blade 86 has an extension 87 disposed within one of the slots 85'. Each extension 87 has openings in one side thereof to receive one end of a guide pin 88 and the ends of spring members 89. The lower portion 85 of the inner sealing member 83 possesses corresponding openings to receive the other ends of the guide pin 88 and spring members 89. The other side of each blade extension 87, facing the outer sealing head A, has formed thereon raised areas or bosses 90. The amount of radial or transverse movement which will be imparted to each of the blades 86 is equal to the height of the raised areas 90. To provide the limits of transverse or radial movement of the blades 86, as well as the desired relative movement between the blades and the outer sealing head A, adjustable stops 91 are threaded through the walls of the outer sealing head A for cooperating engagement with the flat and raised areas of the blade extensions 87.

The construction of the blades is individually illustrated in detail in Figures 14 and 15. It will be noted that the blade 86 possesses a contoured edge 86' which will complement the edge or area where the flaps are connected to the panels of the carton.

To supply heat to the blades 86 of the inner sealing and molding head B, heating means, preferably an electrical resistance element 92 connected to a source of current by wire 93, is disposed in a hollow portion provided in said inner head. The metallic blades 86 in contact with the lower portion 85 of the inner sealing head are heated by conduction. The outer sealing head A is heated by a group of electrical resistance elements 94 connected by wires 95 to a current source and suitably enclosed within said sealing head.

If desired, a micro-switch 96 may be provided in the position shown in Figures 1, 2 and 3 so that the motor 25 will receive power only when the wall 67 of the carton chamber C contacts the switch and the chamber is under the sealing heads A and B ready to have the membrane 76 molded and sealed within the opening of the carton 77. An adjustable stop 97 threaded in bracket 98 is provided for limiting the rearward travel of the chamber C.

The machine described operates in the following manner. A supply of cartons 77 and flexible membranes 76 of the construction and characteristics described in pending application of Robert A. Farrell, Serial No. 686,537 filed July 26, 1946, now Patent 2,496,043 granted January 31, 1950, is prepared for assembly into the packages. The carton 77 is placed in the chamber C, the door 68 closed and locked by means of the pin and latch arrangement 71, 72. The flaps 78 are supported on the flap support 74 and held in position by the flap holding lugs 75. A membrane 76 is placed over the carton opening with its edges overlapping the flaps in the areas adjacent the carton opening. The membrane locating pins 79 assure that the membrane is properly located over the opening. The handle 65 is grasped and the assembly is moved back under the sealing and molding heads A and B in the direction of the arrow D (Figure 3). The proper positioning of the assembly is assured by the guide members 60. Also, when the carton chamber C is in its proper position, the wall 67 thereof contacts the micro-switch 96 which starts the motor 25. At this point the motor 25 through the sprockets 27, 27' and chain 28 rotates the shaft portion 29.

The handle 34 is depressed causing the teeth of the driven clutch element 32' to mesh with the teeth of the driving clutch element 32. This will cause the shaft portion 29' to make one complete revolution whereupon due to the action of tension spring 33, the clutch elements will disengage. The cam grooves 52 and 56 of the cam plates 50 and 54, respectively, are designed so that one revolution of the shaft portion 29' will cause the inner and outer sealing heads to be depressed to seal and mold the membrane 76 within the opening of the carton 77 and onto the flaps 78 and return to their initial position ready for operation upon the next carton.

The sequence of operation is best illustrated in Figures 10, 11, and 12. In Figure 10 is shown the relationship of the inner and outer sealing heads A and B in their uppermost or initial position. In Figure 11, the outer sealing head A has moved downwardly a portion of its stroke. The inner head B has moved to the limit of its downward motion. In this position the blades 86 have a combined area less than the carton opening and have depressed the membrane a short distance within the carton opening. The four blades 86 displace an area less than the area of the carton opening because the stops 91 still bear against the raised areas 90 and thus hold the blades in their retracted position. The marginal edges of the membrane 76, it will be observed, are unadhered at this point.

As shown in Figure 12, the outer sealing head A continues downward to its lowermost limit resulting in the marginal portions of the membrane 76 being pressed against the flaps 74 and adhered thereto adjacent the carton opening. Due to the continued movement downwardly of the outer sealing head A, the stops 91, which hitherto had been in contact with the raised areas 90 to hold the blade elements 86 in their retracted position, move off said raised areas onto the flat portions of the blade extensions 87. Due to the action of the springs 89, the blades 86 will be uniformly expanded in all directions to press areas of the membrane against the inner periphery of the carton opening. The sealing head A and the blades 86 being heated, the heat-activatable or heat-activatable coated membrane is securely and snugly shaped or molded and sealed within the inner periphery of the carton and onto the areas of the flaps adjacent the opening. The cycle is completed by the return of the sealing and molding heads to their initial position as shown in Figure 10. In returning to the initial position resulting from the action of the rotating cam plates 50 and 54 upon their respective cam followers 53 and 57, the stops 91 will ride back onto the raised areas 90 thereby contracting the blades 86 together. The carton chamber is moved out from under the sealing heads in the direction of the arrow E (Figure 4). The chamber is opened, the product removed and the machine is ready for another operation.

It is evident that the operation described may be used to put a liquid or siftproof bottom on a carton whereupon the carton may be turned upside down, filled with a suitable commodity and the operation repeated to completely seal the package. It then simply requires folding and adhering the flaps 78 to complete the package.

While the machine disclosed is of the semiautomatic type, it is within the scope of the invention to provide a series of carton chambers secured to a conveyor to position the cartons and membranes under the heat sealing and molding heads. In lieu of the hand operated clutch, automatic means may be provided for operating the molding and sealing heads in timed relation to the proper positioning of the carton chambers.

The machine described readily shapes, forms or molds a flexible sealing membrane within a carton opening and onto the flaps thereof and does not require that the membrane have predetermined score lines. Since the membrane is shaped and formed in situ just prior to the sealing operation using the end of the carton or container as a die or former, the individual membrane will be given the exact complemental contour of the inner perimetric opening adjacent the end of the container. A perfect seal is insured because each portion of the membrane in contact with the inner surfaces of the container and the flaps is sealed and bonded under uniform tension. Thus even though slight variations in the dimensions and contour may occur in the open end of the containers resulting from normal manufacturing operations, the sealing membrane applied to each container is formed or shaped to the precise contour of every slight variation of the container end. The closure membrane formed either of a self-sustaining thermoplastic film or of a sheet material provided with a thermoplastic coating of suitable thickness will provide a hermetic seal at the ends of the container when sealed into position by heat and pressure in the manner described.

It is preferred to use a sealing temperature as near as possible to the melting point of the thermoplastic film or coating to minimize dissipation or absorption of the sealing medium into the side walls or flaps of the container. This provides a maximum viscosity or consistency of the thermoplastic substance of the membrane when the seal is formed thus insuring a complete closure even though variations may occur in the perimetric contour or dimensions of the open end of the container, a normal occurrence in commercial manufacturing. It is important to select a membrane which has adequate bursting strength and stretch in order to withstand the mechanical strains to which the membrane is exposed during the molding and sealing operation. The membrane should, of course, retain its flexibility and strength in the final sealed package. Furthermore, when the membrane is formed of coated sheet material it is important to select the components of such coated sheet to insure anchorage of the coating so that it will not separate or loosen from the base sheet when exposed to the materials within the package.

The present invention may be embodied in other specific forms without departing from the essential attributes thereof. It is desired that the present specific embodiment be considered in all respects as illustrative and not restrictive, reference being had to the appended claims rather than to the aforegoing description to indicate the scope of the invention.

We claim:

1. A machine for making a leakproof package comprising means for positioning a tubular carton having end flaps with the flaps in a plane substantially at a right angle with respect to the main carton body and a membrane covering the carton end with the margins thereof overlapping portions of said flaps, a heated tubular sleeve having its inside dimensions substantially the same as the carton end, a member disposed and guided within said sleeve, heated blades mounted on said member for limited movement in a plane substantially at a right angle with respect to the main carton body and having a combined surface area less than the area of said carton end and of substantially the same contour, cam means operatively connected to said sleeve and said member for imparting movement to said sleeve and to said member and for imparting movement to said sleeve with respect to said member in timed relation, and means mounted on said sleeve and on said blades for imparting said movement to said blades when the sleeve moves relative to the member whereby the membrane is molded within the carton end.

2. A machine for making a leakproof package comprising means for positioning a tubular carton having end flaps and a membrane covering the carton end with the margins thereof overlapping portion of said flaps, means for supporting said flaps in a plane substantially at a right angle with respect to the main carton body, a heated tubular sleeve having its inside dimensions substantially the same as the carton end, a member disposed and guided within said sleeve, heated blades mounted on said member for limited movement in a plane substantially at a right angle with respect to the main carton body and having a combined surface area less than the area of said carton end and of substantially the same contour, cam means operatively connected to said sleeve and said member for imparting movement to said sleeve and to said member and for imparting movement to said sleeve with respect to said member in timed relation, and means mounted on said sleeve and on said blades for imparting said movement to said blades when the sleeve moves relative to the member whereby the membrane is molded within the carton end.

3. A machine for making a leakproof package comprising means for positioning a tubular carton having end flaps, means for supporting said flaps in a plane substantially at a right angle with respect to the main carton body, means for positioning a membrane over the carton end with the margins thereof overlapping at least portions of said flaps, a heated tubular sleeve having its inside dimensions substantially the same as the carton end, a member disposed and guided within said sleeve, heated blades having a combined surface area less than the area of said carton end and of substantially the same contour, extensions secured to said blades and mounted on said member for movement of said blades in a plane substantially at a right angle with respect to the main carton body, cam means operatively connected to said sleeve and said member for imparting movement to the sleeve and the member and for imparting movement to the sleeve with respect to the member, and means mounted on said sleeve and on said extensions for imparting said movement to said blades when the sleeve moves relative to the member, whereby the membrane is molded within the carton end.

4. In a machine of the character described, a tubular sleeve, a member disposed and guided within said sleeve, blades having a combined transverse surface area less than the cross-sectional area of the opening in said sleeve and having a peripheral contour substantially the same as the peripheral contour of said opening, means mounting said blades on said member in transversely-movable relation, a raised area on each of said blades, means mounted on said sleeve for engagement with said raised areas for imparting movement to said blades with respect to said member and means for imparting movement to said sleeve with respect to said member in timed relation.

5. In a machine of the character described, a tubular sleeve, a member disposed and guided within said sleeve, blades having a combined transverse surface area less than the cross-sectional area of the opening in said sleeve and having a peripheral contour substantially the same as the peripheral contour of said opening, means mounting said blades on said member in transversely-movable relation, a raised area on each of said blades, means extending inwardly from said sleeve for engagement with said raised areas for imparting movement to said blades with respect to said member and cam means for imparting movement to said sleeve with respect to said member in timed relation.

6. In a machine of the character described, a hollow sealing head, a member guided for linear movement within said head having a bottom end portion with slots therein, blades adjacent said bottom end portion each having an extension disposed within a slot of said bottom end portion, a raised area on each of said extensions, means for resiliently mounting on and slideably guiding said extensions with respect to said member and means mounted on said sealing head engaging said extensions and raised areas for imparting linear transverse movement to said blades with respect to said bottom end portion.

7. A machine for making a leakproof package including: means for positioning a tubular carton having end flaps; means for supporting said flaps in a plane substantially at a right angle to the main body of the carton; means for positioning a membrane over the carton end with the margins thereof overlapping a portion of the end flaps, the membrane bearing an adhesive coating on the surface in contact with the end flaps; a heated tubular sleeve in line with the main body of the carton, having its inside dimensions substantially the same as the carton end, and mounted for reciprocating movement in a line substantially parallel to the longitudinal axis of the carton; a member mounted within said sleeve for reciprocating movement with respect thereto along the line of movement of the sleeve; heated transversely-expandible means mounted on said member adjacent the carton end; cam means operatively connected to said sleeve and to said member to reciprocate the sleeve and the member and to reciprocate the sleeve relative to the member, to move said member into contact with the membrane and then a predetermined distance into the carton end, and then to move said sleeve to press the margins of said membrane into contact with said flaps; and means to expand the transversely-expandible means to press said membrane into contact with the main body of said carton when said member has moved into the carton end said predetermined distance; whereby to mold said membrane into said carton end and to seal the membrane within the carton end and to said flaps.

ROBERT A. FARRELL.
WILLIAM G. MUELLER.

REFERENCES CITED

The following references are of record in the file of this patent:

UNITED STATES PATENTS

| Number | Name | Date |
| --- | --- | --- |
| 918,619 | Weber | Apr. 20, 1909 |
| 1,585,820 | Baum | May 25, 1926 |
| 1,647,289 | Gwinn | Nov. 1, 1927 |
| 1,927,212 | Hawkins | Sept. 19, 1933 |
| 1,962,213 | Reed | June 12, 1934 |
| 2,087,251 | Gough | July 20, 1937 |
| 2,106,738 | Harrison | Feb. 1, 1938 |
| 2,114,624 | Bergstein | Apr. 19, 1938 |
| 2,173,122 | Mancuso | Sept. 19, 1939 |
| 2,241,711 | Towey | May 13, 1941 |
| 2,244,282 | Bergstein | June 3, 1941 |
| 2,265,188 | Murch | Dec. 9, 1941 |
| 2,386,787 | Geertsen | Oct. 16, 1945 |